Aug. 24, 1965  H. RUDOW ETAL  3,202,391
MOUNTING BRACKETS FOR TUBULAR FURNITURE LEGS
Filed Oct. 17, 1963  2 Sheets-Sheet 1
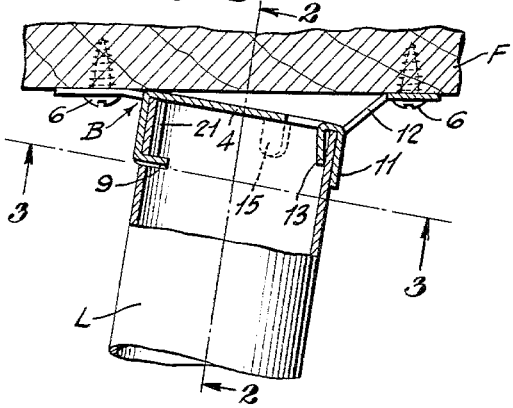
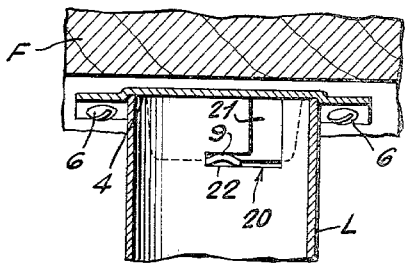
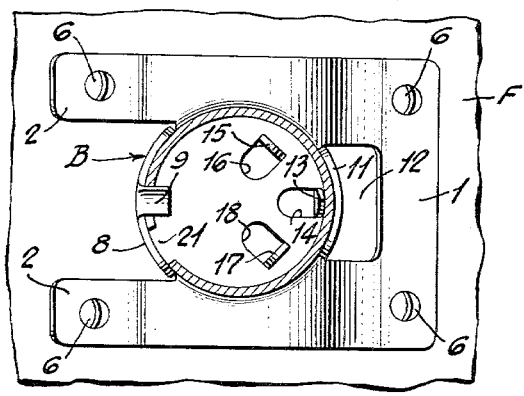
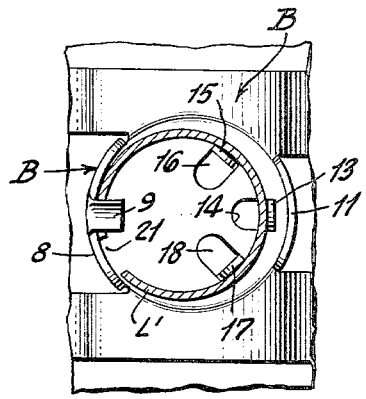
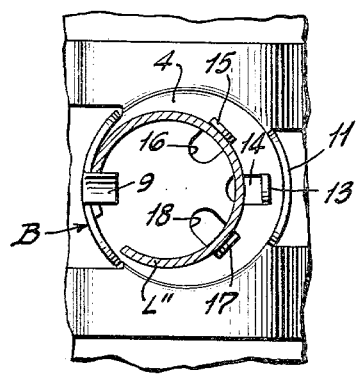
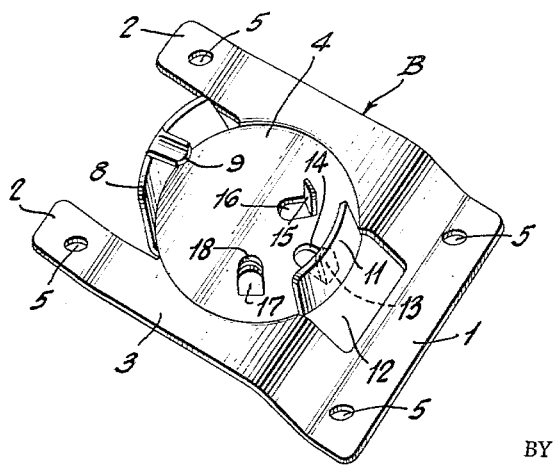
INVENTORS
HENRY RUDOW
MAURICE RUDOW
BY *[signature]*
ATTORNEY

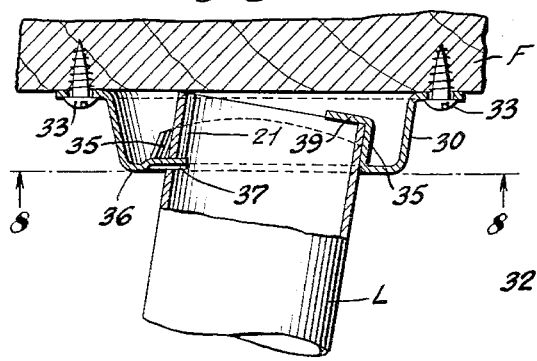
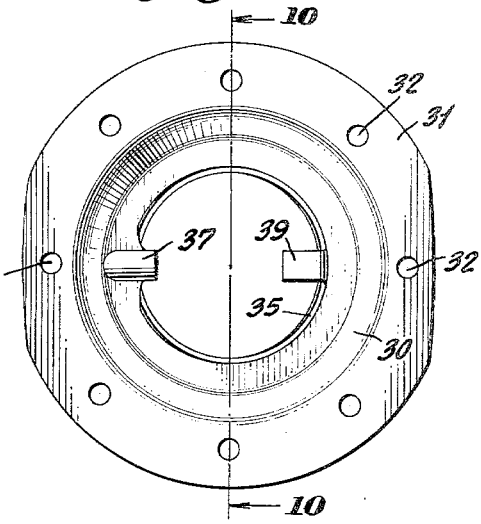
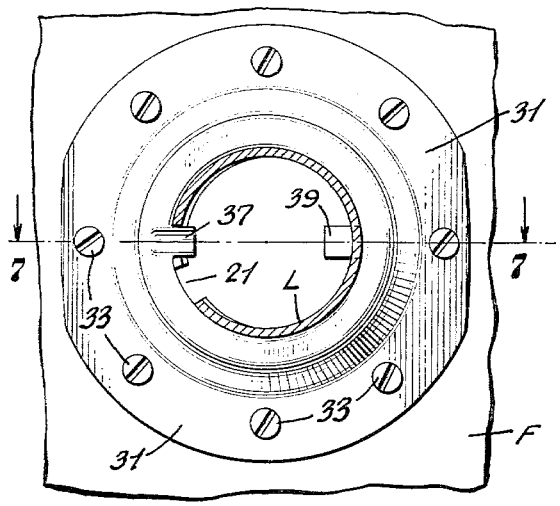
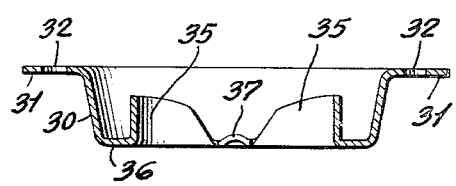
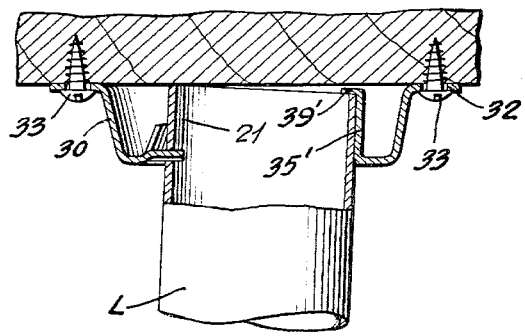
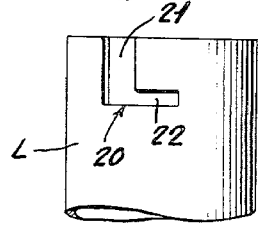
INVENTOR
HENRY RUDOW
MAURICE RUDOW
BY Samuel Elowitz
ATTORNEY United States Patent Office 3,202,391
Patented Aug. 24, 1965

3,202,391
MOUNTING BRACKETS FOR TUBULAR
FURNITURE LEGS
Henry Rudow, 4101 Priscilla Lane, and Maurice Rudow,
6801 Hunt Court, both of Baltimore, Md.
Filed Oct. 17, 1963, Ser. No. 316,809
8 Claims. (Cl. 248—188)

This invention relates to mounting brackets for tubular furniture legs and particularly to sheet metal brackets which are adapted to be affixed to furniture units and to which are adapted to be connected tubular legs of cylindrical or frusto-conical outline.

It is the object of the present invention to provide rugged metal brackets of small depth, which may be fabricated economically and which may be affixed to the underside of furniture units such as tables, chairs, stools and the like, and to which may be connected rapidly and securely supporting tubular legs of metal or composite materials. The latter may be shipped in a knocked-down state and may be interconnected with the brackets by a simple mechanical movement without need for any tools, to provide a secure and tight interlock between the brackets and the tubular legs over long periods of use.

It is another object of the invention to provide a bracket and tubular leg assembly characterized by an interlocking connection between the parts at one circumferential portion of the tubular leg and to provide one or more stabilizing supports for the leg at circumferential portions thereof displaced from the interlocking connection.

It is a further object of the invention to provide a sheet metal bracket for furniture items which is adapted to have connected thereto tubular metal legs of different diameters without requiring any modification of the sheet metal bracket.

Another object of the invention is to provide a sheet metal bracket fitted with a tongue for engagement with an interlocking angular slot at one portion of the tubular leg and with at least one stop of predetermined depth at a point spaced circumferentially from the tongue to vary the angularity of the leg with respect to the bracket and the furniture item to which the same is attached, in accordance with varying needs.

Other objects and purposes will appear from the detailed description of the invention following hereinafter, taken in conjunction with the accompanying drawings, wherein FIG. 1 is a vertical sectional view, with a minor part in elevation, of a sheet metal bracket in accordance with the invention, which is adapted for detachable interconnection with tubular legs of varying diameter;

FIG. 2 is a sectional view along line 2—2 of FIG. 1;

FIG. 3 is a sectional view along line 3—3 of FIG. 1;

FIG. 4 is a perspective view of the universal bracket illustrated in FIGS. 1 to 3;

FIG. 5 is a sectional view corresponding to that shown in FIG. 3 illustrating the connection of a tubular leg of smaller diameter than that shown in the latter;

FIG. 6 is a sectional view similar to FIGS. 3 and 5, illustrating the connection of a tubular leg of still smaller diameter than that shown in FIGS. 3 and 5;

FIG. 7 is a vertical sectional view of another embodiment of the invention, featuring a bracket of small depth provided with a socket therein for the detachable interconnection of a tubular leg therewith, along line 7—7 of FIG. 8;

FIG. 8 is a bottom view of the bracket shown in FIG. 7, along line 8—8 thereof;

FIG. 9 is a top view of the bracket along the junction line of the furniture unit therewith;

FIG. 10 is a vertical sectional view along line 10—10 of FIG. 9;

FIG. 11 is a vertical sectional view of a modified embodiment of the bracket shown in FIG. 7, which permits a steeper disposition of the tubular leg within the bracket than that shown in the latter; and FIG. 12 is a front elevation of the upper end of the tubular leg and the L-shaped slot therein which interlocks with the brackets of the type illustrated in the preceding figures.

FIGS. 1 to 6 illustrate a universal bracket stamped from sheet steel or other malleable metal, which is adapted to be affixed to the underside of a furniture unit F and to which may be connected tubular furniture legs of three different diameters such as 1⅛", 1¼" and 1½", in dependence upon the loads adapted to be supported by the furniture legs.

The universal bracket B in accordance with the invention is provided with end portions 1 and 2 lying in a common plane with an intermediate portion 3 disposed at an angle, for example 10°, to impart a corresponding angularity to the table leg with respect to the vertical. A circular seat 4 may be impressed or embossed in the intermediate portion 3 to function as a stop for the end of the tubular leg L which is adapted to be interconnected detachably with the bracket at the time of the assembly of the leg with the bracket.

Openings 5 are provided in the end portions 1 and 2 of the bracket for the reception of screw or other fasteners 6, which may interconect the bracket with the furniture unit at the factory, preparatory to the shipment thereof with the tubular metal legs in a knocked-down state for assembly at the retail outlet or ultimate consumer, without need for any special skills or tools.

The end of the bracket opposite the continuous end 1 is slotted along lines displaced from its edges to form spaced arms 2, and a part 8 of the intermediate portion between the slots is bent transversely to the plane of the seat 4 at the junction of the portion therewith, to dispose the projection 8 perpendicularly to the plane of the seat 4. The outer portion of part 8 is provided with a tongue 9 which is bent transversely to the plane of the projection 8 in overlying relation with the seat 4.

A second projection 11 is stamped from an opening 12 adjacent to the continuous end 1 of the bracket and, as clearly shown in the drawings, both projections 8 and 11 are curved transversely corresponding to the curvature of the seat 4 so that they embrace closely the external lateral wall of the tubular leg L at diametrally opposed portions thereof.

The tongue 9, extending transversely from the projection 8, is dished transversely of its radial axis to assure a secure and tight interconnection of the tubular leg with the bracket. The convexity or concavity imparted to the tongue serves to strengthen it. In addition, it imparts a substantial depth to the tongue even though the same is formed of sheet metal of relatively light gauge, and finally, because of its transverse curvature it operates to guide the parts accurately into mutual engagement when the tubular leg is interengaged with the bracket as described below.

The parts of the bracket as described above are designed to accommodate a tubular leg of maximum diameter, which may be either cylindrical or nearly so in the event that frusto-conical legs are used which taper from the furniture unit towards the floor. The upper end of the leg, as clearly shown in the sectional view in FIG. 2, is provided with an angular slot 20 having two branches, resembling an L-shaped slot. The branch opening 21, which extends in parallel to the axis of the tubular leg, is of a width slightly greater than that of the tongue 9 and the circumferential portion 22 of the slot may have a depth of ³⁄₃₂″ so as to accommodate tightly the dished tongue. The portion 22 of the slot is spaced from the end of the tubular leg corresponding to the displacement of the tongue 9 from the circular seat 4. This permits the tubular leg to be moved towards the seat 4 by a rectilinear movement thereof when the opening 21 is moved past tongue 9, which is followed by a rotary movement of the leg when the tongue 9 is guided within the circumferential portion 22 of the slot. This dual movement of the leg relative to the tongue results in a secure interlocking of the tongue of the bracket within the slot in the leg by virtue of the fact that the tongue occupies the complete depth of the circumferential portion 22, as described above, and is compressed therein.

The interlocking engagement of the tongue 9 of the bracket with the angular slot 20 in the leg, coupled with the bracing of the tubular leg at the diametrally opposed portions thereof by means of arcuate projections 8 and 11, and the seating of the end of the leg within the circular embossed seat 4, is braced further by the provision in the bracket of means for the mounting of tubular legs of lesser diameter than the maximum. For this purpose a lug 13 is stamped from an opening 14 in the circular seat 4 and is bent transversely from the plane thereof in substantial parallelism with the projection 11 adjacent thereto. This lug 13 abuts the inner lateral wall of the end of the tubular leg L so that the leg is disposed between the large outer abutment 11 and the small inner abutment 13 at the mid-portion of the former.

The lug 13 is designed to serve as the outer abutment for a tubular leg L′ of smaller diameter, which may be provided with an angular slot 20 identical to that provided in tubular leg L of larger diameter. The interconnection between the bracket and the leg L′ is illustrated in FIG. 5 wherein the lug 13 serves to embrace the outer wall of the smaller leg. The interlocking engagement of the tongue 9 with the angular slot 20 is the same as that shown in FIG. 3.

However, the secure retention of the end of the leg L′ against the circular seat 4 is supplemented by the provision of additional lugs 15 and 17 which are stamped from openings 16 and 18, respectively, in the circular seat, with the lugs bent transversely from the plane 4 and disposed at symmetrical radial points with respect to the longitudinal axis of the bracket containing both the centers of bracing projections 8 and 11, tongue 9, and lug 13. In this case, the lugs 15 and 17 abut the internal wall of the tubular leg L′ at circumferentially placed portions relative to the abutment of lug 13 against the outer wall, which results in a secure mounting of the smaller leg L′ on the bracket B.

FIG. 6 illustrates the interconnection of a tubular leg L″ of still smaller diameter than leg L′, for example, 1⅛″ in comparison to 1¼″. This leg is provided with an angular slot 20 similar to that provided in legs L and L′ for interengagement with the tongue 9 of the bracket. However, in this case the lugs 15 and 17 abut the outer wall of the tubular leg which imparts sufficient stability thereto, without any internal support in view of the fact that the legs of smaller diameter are designed for lesser loads than those of larger diameter.

If desired, the lugs 13, 15 and 17 may be curved transversely to conform more closely to the curvature of the tubular legs in a manner similar to the projections 8 and 11. However, because of their relatively small circumferential length, this expedient is not essential.

In FIGS. 7 to 11 are illustrated additional embodiments of the invention which permit the stamping of sheet metal brackets of small depth from relatively thin gauge metal, which are nevertheless of sufficient strength to support tubular legs of cylindrical or frusto-conical outline over long periods of time. These brackets embody the same type of interlocking interengagement between a dished tongue on the bracket and an angular slot on the leg, as shown in FIG. 12, with a stabilizing stop for the end of the leg provided at a portion of the bracket spaced circumferentially from the tongue and slot interengagement. In addition, this stabilizing stop may be adjusted conveniently in the course of stamping of the bracket to impart different degrees of angularity to the tubular leg; for example, the embodiment shown in FIGS. 7 to 10 illustrates a bracket design which supports a tubular leg at an angle of 10° to the vertical, while the stabilizing stop in FIG. 11 serves to position the leg at an angularity of 2° to the vertical.

The bracket illustrated in FIGS. 7 to 11 is stamped from sheet steel or other malleable metal to form a continuous flange 31 provided with openings 32 to enable the bracket to be affixed to the underside of a furniture unit F by means of screw or other fasteners 33. The bracket is shaped with an external wall 30 and internal wall 35 with an end wall 36 at the points of mergence of the external and internal walls, to impart a pleasing and finished appearance to the bracket when the same is mounted to the underside of the furniture unit.

The tongue 37 projects inwardly from the end wall 36 in overlying relation to the substantially cylindrical seat or socket for the tubular leg which is formed by the internal wall 35.

The end of the tubular leg L is inserted into the central socket by a rectilinear movement when the slot 21 is in alignment with the tongue 37, and which is, as described above, slightly narrower than the slot 21. The tongue 37 is dished for the same reasons and to obtain the same objectives as the tongue 9 described above in connection with the embodiment of the bracket illustrated in FIGS. 1 to 6. After forcing the end of the leg into the socket to the point where the circumferential portion of the slot 22 is opposite to the tongue 37, a rotary movement imparted to the leg serves to cam the tongue 37 into the portion 22 to obtain a secure interconnection between the leg and the bracket.

Additional stability is imparted to the leg mounting by virtue of the inner wall 35 of the socket which is continuous from the opposite edges of the tongue 37, as may be seen in FIGS. 7 and 10. In addition, a lug 39, projecting from the edge of the wall 35 remote from the end wall 36, may be bent transversely to the wall 35 to provide an abutment for the end of the leg which is spaced circumferentially from the tongue 37. While a single tongue 39 is shown in FIGS. 8 and 9, more than one, at radially displaced points, may be provided. The depth of the inner wall 35, whereat the transverse stop is bent, may be used to control the angularity of the tubular leg, and, as shown in FIG. 11, when the inner wall 35′ is of large depth, leaving only a short length of lug 39′ to act as a stop, the tubular leg L is inserted into the socket at a steeper inclination, for example, at 2° inclination rather than at 10°, which is the case with the lug arrangement shown in FIGS. 7 to 10, when the stop lug 39 is longer.

While we have described our invention as embodied in specific forms and as operating in specific manners for purposes of illustration, it should be understood that we do not limit our invention thereto, since various modifications will suggest themselves to those skilled in the art without departing from the spirit of our invention, the scope of which is set forth in the annexed claims.

We claim:

1. A sheet metal mounting bracket for selectively mounting differently sized tubular furniture legs adapted to be affixed to the underside of a furniture unit, said bracket being of small depth and having a circular seat for receiving the end of the leg therein, a tongue stamped from said bracket in overlying relation to said seat and displaced from the base of said seat, said tongue adapted to engage an angularly-shaped slot at the end of the tubular leg to permit a rectilinear movement of the leg against the seat followed by a rotary movement of the leg with respect thereto to lock the leg thereagainst, and integral projections stamped from said bracket remote from said tongue and disposed in planes transverse to that of said tongue adapted to abut the end of the lateral wall of the furniture leg to stabilize the securement of the leg to said bracket as the end of the leg abuts said circular seat.

2. A sheet metal mounting bracket for selectively mounting differently sized tubular furniture legs adapted to be affixed to the underside of a furniture unit, said bracket being of small depth and having a circular seat for the end of the leg, projections extending transversely to said seat at diametrally opposed portions thereof, an integral tongue extending transversely from one of said projections in overlying relation to said seat and displaced from the base of said seat, said tongue adapted to engage an angularly-shaped slot at the end of the tubular leg to permit a rectilinear movement of the leg against the seat followed by a rotary movement of the leg with respect thereto to lock the leg thereagainst, and at least one additional integral projection extending transversely from said seat adjacent to said other projection adapted to selectively stabilize the support of tubular legs of different diameters.

3. A sheet metal mounting bracket for selectively mounting differently sized tubular furniture legs adapted to be affixed to the underside of a furniture unit, said bracket being of small depth and having a circular seat for the end of the leg, projections extending transversely to said seat at diametrally opposed portions thereof, an integral tongue extending transversely from one of said projections in overlying relation to said seat and displaced from the base of said seat, said tongue being dished transversely relative to its radial axis and adapted to engage an L-shaped slot at the end of the tubular leg, to permit a rectilinear movement of the leg against the seat followed by a rotary movement of the leg with respect thereto to lock the leg thereagainst, and at least one additional integral projection extending transversely from said seat adjacent to said other projection adapted to selectively stabilize the support of tubular legs of different diameters.

4. A sheet metal mounting bracket for selectively mounting differently sized tubular furniture legs adapted to be affixed to the underside of a furniture unit, said bracket being of small depth and having a circular seat for the end of the leg, projections extending transversely to said seat at diametrally opposed portions thereof, an integral tongue extending transversely from the midportion of one of said projections in overlying relation to said seat and displaced from the base of said seat, said tongue being dished transversely relative to its radial axis and adapted to engage an L-shaped slot at the end of the tubular leg, to permit a rectilinear movement of the leg against the seat followed by a rotary movement of the leg with respect thereto to lock the leg thereagainst, and a plurality of additional integral projections extending transversely from said seat adjacent to said other projection and at different distances from said tongue adapted to selectively stabilize the support of tubular legs of different diameters.

5. A device as set forth in claim 4 wherein at least the projections at the diametrally opposed portions of the seat are curved transversely in conformity to the curvature of the tubular leg adapted to be embraced thereby.

6. A sheet metal mounting bracket for selectively mounting differently sized tubular furniture legs adapted to be affixed to the underside of a furniture unit, said bracket being of small depth and having a circular seat for the end of the leg, arcuate projections extending transversely to said seat at diametrally opposed portions thereof, an integral tongue extending transversely from the midportion of one of said projections in overlying relation to said seat and displaced from the base of said seat, said tongue being dished transversely relative to its radial axis and adapted to engage an L-shaped slot at the end of the tubular leg, to permit a rectilinear movement of the leg against the seat followed by a rotary movement of the leg with respect thereto to lock the leg thereagainst, and a plurality of additional integral projections extending transversely from said seat adjacent to said other projection and at different distances from said tongue adapted to selectively stabilize the support of tubular legs of different diameters, said additional projections comprising a lug coincident with the longitudinal axis containing the centers of said arcuate projections and proximate to said other projection, and a pair of lugs displaced symmetrically from said longitudinal axis and disposed at the same distance from said arcuate projection bearing said tongue, said distance being less than that of said first lug from said last-mentioned arcuate projection.

7. A device as set forth in claim 4 wherein the plurality of additional projections comprises a lug spaced from said other projection along the same longitudinal axis as said last-mentioned projection and tongue and adapted to abut selectively either the inner wall of a tubular leg of larger diameter or the outer wall of a tubular leg of smaller diameter.

8. A device as set forth in claim 4 wherein the plurality of additional projections comprises a pair of lugs displaced symmetrically from the longitudinal axis of the bracket containing the centers of the projections at the diametrally opposed portions of the seat for abutting the outer wall of a tubular leg of minimum diameter at circumferentially displaced points.

References Cited by the Examiner

UNITED STATES PATENTS

| 2,381,233 | 8/45 | Summers | 24—221 |
| 2,879,086 | 3/59 | Perry | 287—20 |
| 3,079,120 | 2/63 | Schwartz | 248—188 |
| 3,131,899 | 5/64 | Luhrs | 248—188 |

FOREIGN PATENTS

| 1,266,472 | 6/61 | France. |

CLAUDE A. LE ROY, *Primary Examiner.*